United States Patent
Chen et al.

(10) Patent No.: US 9,929,444 B2
(45) Date of Patent: Mar. 27, 2018

(54) BATTERY PACK AND METHOD OF INDICATING REMAINING CAPACITY THEREOF

(71) Applicant: CHERVON INTELLECTUAL PROPERTY LIMITED, Road Town (VG)

(72) Inventors: Wu Chen, Nanjing (CN); Fengqin Zhou, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 171 days.

(21) Appl. No.: 14/868,830

(22) Filed: Sep. 29, 2015

(65) Prior Publication Data
US 2016/0093928 A1  Mar. 31, 2016

(30) Foreign Application Priority Data
Sep. 30, 2014 (CN) .......................... 2014 1 0521431

(51) Int. Cl.
| | |
|---|---|
| *G01R 27/26* | (2006.01) |
| *H02J 7/00* | (2006.01) |
| *H01M 10/48* | (2006.01) |
| *H01M 10/42* | (2006.01) |

(52) U.S. Cl.
CPC ....... *H01M 10/48* (2013.01); *H01M 10/4257* (2013.01); *H01M 10/4264* (2013.01); *H01M 10/488* (2013.01); *H02J 7/0047* (2013.01); *H01M 2220/30* (2013.01); *H02J 2007/005* (2013.01)

(58) Field of Classification Search
CPC ................ G01R 31/36; G01R 31/3606; G01R 31/3624; G01R 31/3662; G01R 31/3679; H01M 10/48; H01M 10/482; H01M 10/4264; H01M 10/488; H01M 10/4257; H01M 10/425; H01M 10/486; H01M 10/052; H02J 7/007; H02J 7/0047; H02J 7/025
See application file for complete search history.

(56) References Cited

U.S. PATENT DOCUMENTS

| | | | | |
|---|---|---|---|---|
| 2013/0257385 A1* | 10/2013 | Kim | .................... | H01M 10/425 320/134 |
| 2014/0175873 A1* | 6/2014 | Kishimoto | .......... | H01M 10/441 307/10.1 |
| 2014/0375231 A1* | 12/2014 | Suzuki | ................ | B60L 11/1861 318/139 |
| 2016/0064776 A1* | 3/2016 | Ro | ....................... | H01M 10/425 429/61 |

* cited by examiner

*Primary Examiner* — Minh N Tang
(74) *Attorney, Agent, or Firm* — Greenberg Traurig, LLP

(57) ABSTRACT

A battery pack has a battery, a sensor module, a first power supply module and an indicating module. The sensor module is used to detect a change in an electrical field or magnetic field nearby the battery pack and to activate the indicating module in response to the change being detected.

10 Claims, 4 Drawing Sheets

BATTERY PACK AND METHOD OF INDICATING REMAINING CAPACITY THEREOF

RELATED APPLICATION INFORMATION

This application claims the benefit of CN 201410521431.2, filed on Sep. 30, 2014, the disclosure of which is incorporated herein by reference in its entirety.

FIELD OF THE DISCLOSURE

The present disclosure relates generally to battery packs and methods of indicating remaining capacity.

BACKGROUND OF THE DISCLOSURE

For checking the remaining capacity of a battery pack, known battery packs have an indicating device for indicating the remaining capacity of the battery pack. The indicating device is used to illuminate a LED lamp assembly or other electric light. If the indicating device keeps indicating, the battery pack will run out of power by having to activate the indicating device.

To save the energy of the battery pack, some known battery packs have control buttons to control the indicating device. When a user needs to check the remaining capacity of the battery pack, the user can press the control button to activate the indicating device. However, known control buttons are hard to operate because of being configured with a small contact area and users usually go out for field work with a low level battery pack because of forgetting to check the battery pack.

The statements in this section merely provide background information related to the present disclosure and may not constitute prior art.

SUMMARY

In one aspect of the disclosure, a battery pack is provided. The battery pack comprises a battery, a housing for accommodating the battery, a sensor module for monitoring whether a user touches or comes close to the battery pack, a first power supply module for powering the sensor module, and an indicating module for indicating remaining capacity of the battery pack when the sensor module detects a user who touches or comes close to the battery pack. The sensor module connects to the indicating module and the power supply, and the power supply also connects to the battery and the indicating module.

In another aspect of the disclosure, a method for indicating remaining capacity of a battery pack is provided. The method comprises detecting a change in the electrical field or magnetic field nearby the battery pack and indicating the remaining capacity of the battery pack according the voltage of the battery pack in response to the change being detected.

Further areas of applicability will become apparent from the description provided herein. It should be understood that the description and specific examples are intended for purposes of illustration only and are not intended to limit the scope of the present disclosure.

Figure 1:
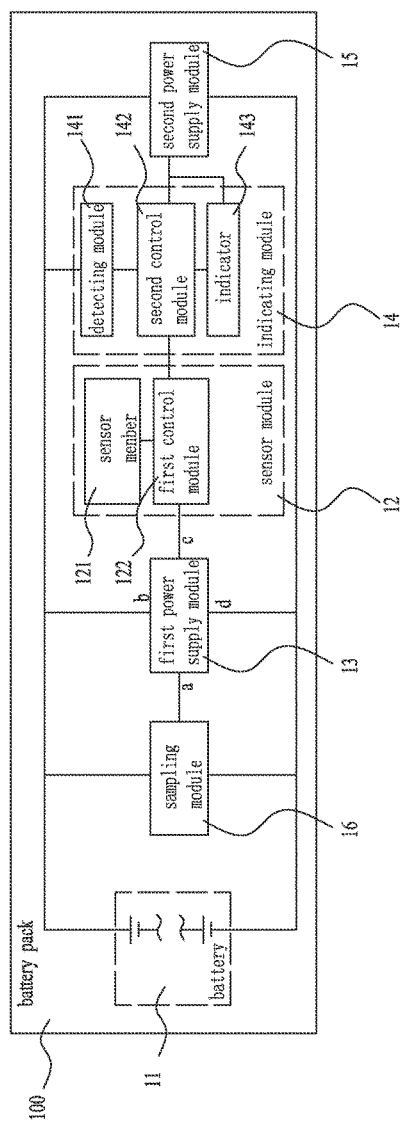
FIG. 1 is a block diagram of an exemplary configuration of a battery pack according the present disclosure.

The drawings described herein are for illustrative purposes only of exemplary embodiments and not all possible implementations and are not intended to limit the scope of the claims hereinafter presented. Corresponding reference numerals indicate corresponding parts throughout the several views of the drawings.

DETAILED DESCRIPTION

An exemplary battery pack 100 as shown in FIG. 1 comprises a battery 11, a sensor module 12, a first power supply module 13 and an indicating module 14. The battery pack 100 has a housing for accommodating the battery 11 and modules referenced above.

As shown in FIG. 1, the sensor module 12 connects to the indicating module 14 and the power supply. The power supply also connects to the battery 11 and the indicating module 14.

Figure 2:
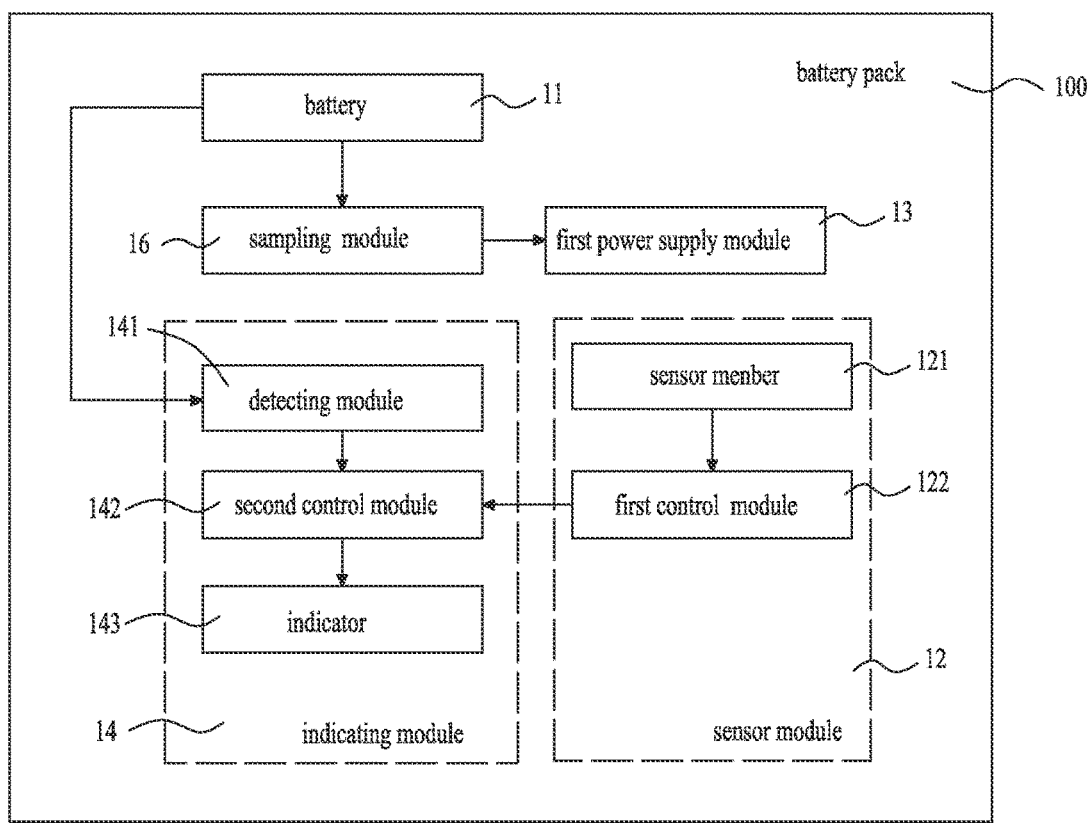
FIG. 2 is a schematic diagram of the signal transmission of the battery pack as shown in FIG. 1.
Figure 3:
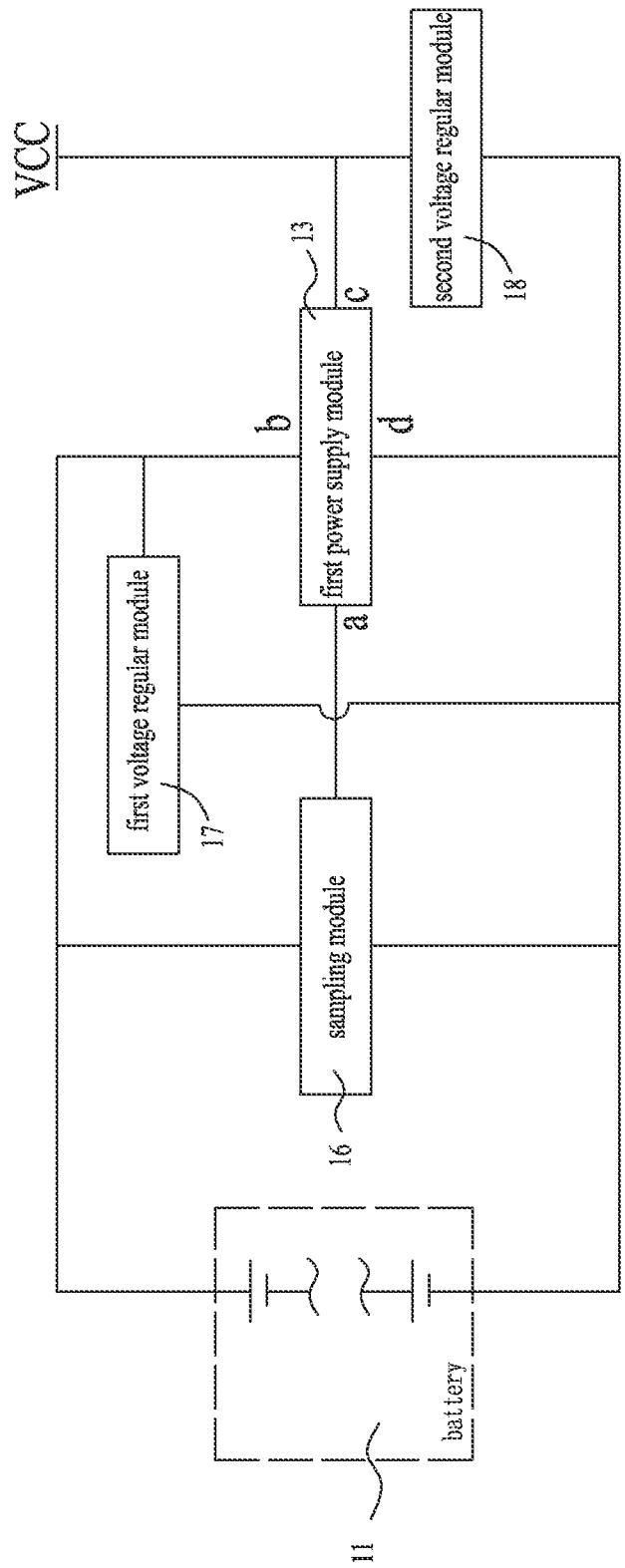
FIG. 3 is a block diagram of a part of the battery pack as shown in FIG. 1.

As shown in FIG. 1 and FIG. 2, the sensor module 12 is capable of monitoring whether a user touches or comes close to the battery pack 100, especially when the user touches or comes close to a certain area of the outside surface of the housing.

The first power supply module 13 is capable of getting electrical energy from the battery 11 so as to supply the sensor module 12 with a certain voltage which is suitable for applying to the sensor module 12.

Referring FIG. 1 to FIG. 2, by way of example, the sensor module 12 may comprise a sensor member 121 and a first control module 122.

The sensor member 121 is capable of detecting changes in an electrical field or magnetic field. The sensor member 121 may be a metal pad which is arrange inside of the housing of the battery pack 100.

Because a user's body is not an absolute electric neutral, static-charge associated with the body will change the electrical field or magnetic field around the sensor member 121 when users is close enough to the sensor member 121.

The first control module 122 is capable of controlling the indicating module 14 according to the detection of the sensor member 121. When the electrical field or magnetic field around the sensor member 121 is caused to be changed, the electrical signal which the first control module 122 samples from the sensor member 121 also changes. The first control module 122 controls the indicating module 14 to activate according to the electrical signal of the sensor member 121 when the electrical signal indicates that somebody has touched or come close to the battery pack 100.

By way of example, the sensor member 121 is made of flexible conductive material so as to be more suitable to the inner wall of the housing of the battery pack 100.

As shown in FIG. 1 and FIG. 2, the battery pack 100 may also include a second power supply module 15 and a sampling module 16.

The second power supply is capable of powering the indicating module 14 by using the electrical energy of the battery 11. The second power supply module 15 connects to the battery 11 and the indicating module 14.

The sampling module 16 connects to the first power supply module 13 and the battery 11. The first power supply module 13 is capable of detecting a voltage from the sampling module 16 which is related to the voltage of the battery 11.

Figure 4:
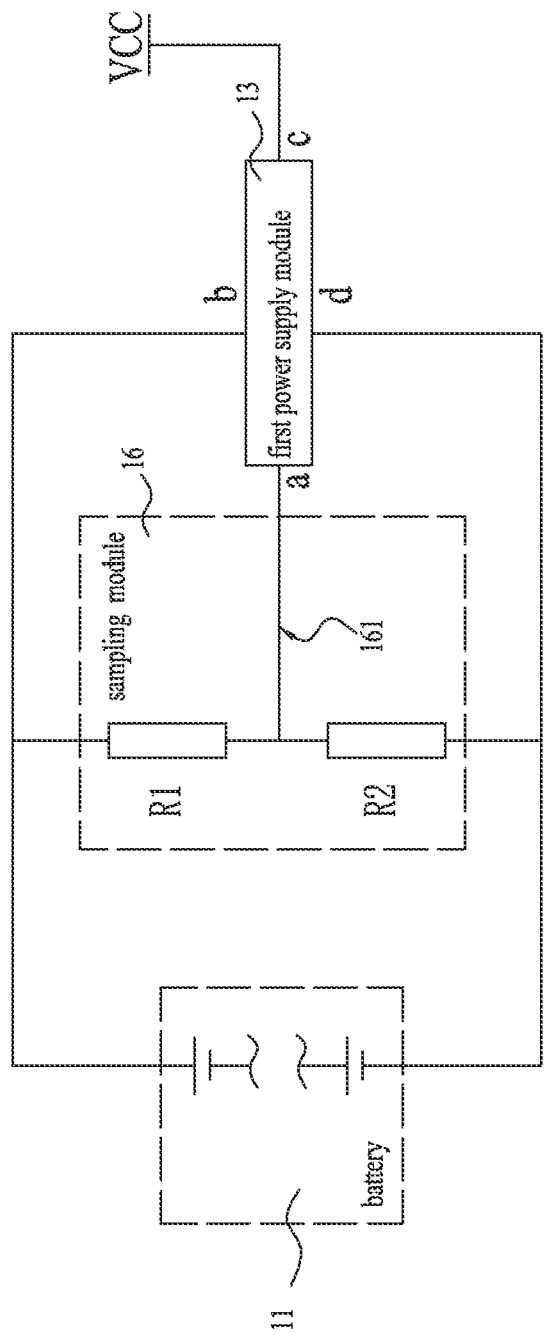
FIG. 4 is a block diagram of the sampling module of the battery pack as shown in FIG. 1.

As shown in FIG. 4, by way of example, the sampling module 16 may comprise a voltage division circuit having a first resistor R1 and a second resistor R2 connected in series and a sampling circuit 161 for connecting the first power supply module 13 to a point between the first resistor R1 and the second resistor R2. The first resistor R1 connects to the positive pole of the battery 11 and the second resistor R2 connects to the negative pole of the battery 11.

As shown in FIG. 1 to FIG. 4, the sampling module 16 can adjust an appropriate sampling voltage range for the first power supply module 13 by configuration of the first resistor R1 and second resistor R2. The first power supply module 13 is capable of determining whether the battery 11 is undervoltage indirectly by detecting the sampling voltage signal from the voltage division circuit.

As shown in FIG. 1 to FIG. 4, the first power supply module 13 may comprise an input end b connecting to the positive pole of the battery 11, an output end c connecting to the sensor module 12, a control end a connecting to the sampling circuit 161, and a referring end d connecting to the negative pole of the battery 11. The input end b is used to access the power supply for the first power supply module 13, and the out end is used to output power to the sensor module 12. The control end a is used to access the sampling signal, and the referring end d is used to access a referring signal to provide a standard reference signal.

For causing the first power supply module 13 to output steadily, it is necessary to regulate voltage which is applied to the first power supply module 13 and which the first power supply module 13 outputs.

As shown in FIG. 4, the battery pack 100 may further comprise a first voltage regular module 17 and a second voltage regular module 18. The first voltage regular module 17 and second voltage regular module 18 both have a capacitor. The first voltage regular module 17 connects to the input end b and the referring end d, and the first voltage regular module 17 is capable of regulating voltage between the input end b and the referring end d so as to regulate voltage which is applied to the first power supply module 13. The second voltage regular module 18 connects to the output end c and the referring end d, and the second voltage regular module 18 is capable of regulating voltage between the input end b and the referring end d so as to regulate voltage which the first power supply module 13 outputs to the sensor module 12.

Furthermore, the first power supply module 13 will stop outputting power to the sensor module 12 when the first power supply module 13 detects the battery 11 is undervoltage.

As shown in FIG. 1 and FIG. 2, the indicating module 14 may include a detecting module 141, an indicator 143 and a second control module 142. The detecting module 141 connects to the battery 11 and the second control module 142. The indicator 143 connects to the second control module 142.

The detecting module 141 is capable of detecting the remaining capacity of the battery 11, by way of example, the detecting module 141 detects the voltage of the battery 11 so as to estimate the remaining capacity of the battery 11.

The indicator 143 is capable of indicating remaining capacity of the battery 11, by way of example, the indicator 143 can indicate remaining capacity of the battery 11 by illuminate in different colors, by illuminating a different number of the lights of the indicator 143, or the like. The indicator 143 may be a LED lamp assembly or other electric light assembly.

The second control module 142 is capable of controlling the indicator 143 according to the detection of the detecting module 141.

Otherwise, a method for indicating remaining capacity of the battery pack 100 described as above is provided. The method comprises detecting a change in the electrical field or magnetic field nearby the battery pack and indicating the remaining capacity of the battery pack according the voltage of the battery pack in response to the change being detected.

Specifically, the sensor module 12 is used to detect the change in the electrical field or magnetic field nearby the battery pack 100 and to activate the indicator to indicate the remaining capacity of the battery pack 100.

Preferably, only a signal which is indicative of the user touching or come close to the battery pack 100 for a certain period of time can activate the indicator.

The method may include shutting off the power supply of the sensor module 12 when the voltage of the battery pack 100 is lower than a preset voltage.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. A battery pack comprising:
   a battery;
   a housing for accommodating the battery;
   a sensor module for monitoring whether a user touches or comes close to the battery pack;
   a first power supply module for powering the sensor module;
   an indicating module for indicating a remaining capacity of the battery pack when the sensor module detects that the user has touched or come close to the battery pack; and
   a sampling module connected with the first power supply module,
   wherein the sensor module connects to the indicating module and the first power supply module,
   wherein the power supply also connects to the battery and the indicating module, and
   wherein the first power supply module is capable of detecting a voltage from the sampling module which is related to the voltage of the battery.

2. The battery pack according to claim 1 further comprising a second power supply module for powering the indicating module by using electrical energy of the battery and wherein the second power supply module connects to the battery and the indicating module.

3. The battery pack according to claim 1, wherein the sensor module comprises a sensor member for detecting a change in an electrical field or a magnetic field and a first control module for controlling the indicating module according to the detection of the sensor member wherein the sensor member is arranged in the housing and connects to the first control module and the first control module connects to the first power supply module.

4. The battery pack according to claim 1, wherein the sampling module comprises a voltage division circuit having a first resistor and a second resistor connected in series and a sampling circuit for connecting the first power supply module at a point between the first resistor and the second resistor and wherein the first resistor connects to a positive pole of the battery and the second resistor connects to a negative pole of the battery.

5. The battery pack according to claim 4, wherein the first power supply module comprises an input end connecting to the positive pole of the battery, an output end connecting to the sensor module, a control end connecting to the sampling circuit, and a referring end connecting to the negative pole of the battery.

6. The battery pack according to claim 5 further comprising a first voltage regular module having a first capacitor and a second voltage regular module having a second capacitor wherein the first voltage regular module connects to the input end and the referring end and the second voltage regular module connects to the output end and the referring end.

7. The battery pack according to claim 1, wherein the indicating module comprises a detecting module for detecting the remaining capacity of the battery, an indicator for indicating remaining capacity of the battery, and a second control module for controlling the indicator according to the detection of the detecting module, wherein the detecting module connects to the battery and the second control module, and wherein the indicator connects to the second control module.

8. The battery pack according to claim 7 further comprising a second power supply module for powering the indicating module by using the electrical energy of the battery and wherein the second power supply module connects to the second control module.

9. A method for indicating remaining capacity of a battery pack comprising a sensor module for detecting when a user touches or comes close to the battery pack, a sampling module connected with the battery pack, and an indicating module for indicating remaining capacity of the battery pack, the method comprising:
- detecting a change in an electrical field or magnetic field nearby the battery pack;
- sampling a voltage of the battery pack with the sampling module to detect a voltage which corresponds to the remaining capacity of the battery pack; and
- causing the indicating module to indicate the remaining capacity of the battery pack according to a voltage of the battery pack in response to the change in the electric field or magnetic field nearby the battery pack being detected.

10. The method according to claim 9 further comprising shutting off the power supply of the sensor module when the detected voltage of the battery pack by the sampling module is lower than a preset voltage.

* * * * *